United States Patent [19]

Weis et al.

[11] Patent Number: 4,490,962
[45] Date of Patent: Jan. 1, 1985

[54] PLASTIC FILM WRAPPER AND SEALER APPARATUS

[75] Inventors: Rudolf R. Weis, Antioch; Rudolph W. Schutz, Walnut Creek, both of Calif.

[73] Assignee: Crown Zellerbach Corporation, San Francisco, Calif.

[21] Appl. No.: 522,139

[22] Filed: Aug. 11, 1983

[51] Int. Cl.³ ............................................. B65B 9/06
[52] U.S. Cl. ..................................... 53/550; 53/373; 156/203; 156/290; 156/466
[58] Field of Search ................ 53/373, 450, 451, 479, 53/550, 551, 552, 557; 156/203, 275.1, 290, 466; 493/248, 302, 439

[56] References Cited

U.S. PATENT DOCUMENTS

| 3,274,746 | 8/1966 | James et al. | 53/550 |
| 4,330,351 | 5/1982 | LoMaglio | 53/550 |

Primary Examiner—Robert L. Spruill
Assistant Examiner—Richard M. Mudd
Attorney, Agent, or Firm—Thomas R. Lampe

[57] ABSTRACT

Apparatus for securing plastic film about a product including a curved forming plate, sealer means cooperating with the plate to form spaced discrete heat seals in overlapping portions of plastic sheet disposed about the plate and product, and transport means for reciprocatably moving the sealer means so that it remains in engagement with overlapped sheet portions and follows the path of movement thereof for a predetermined period of time.

9 Claims, 4 Drawing Figures

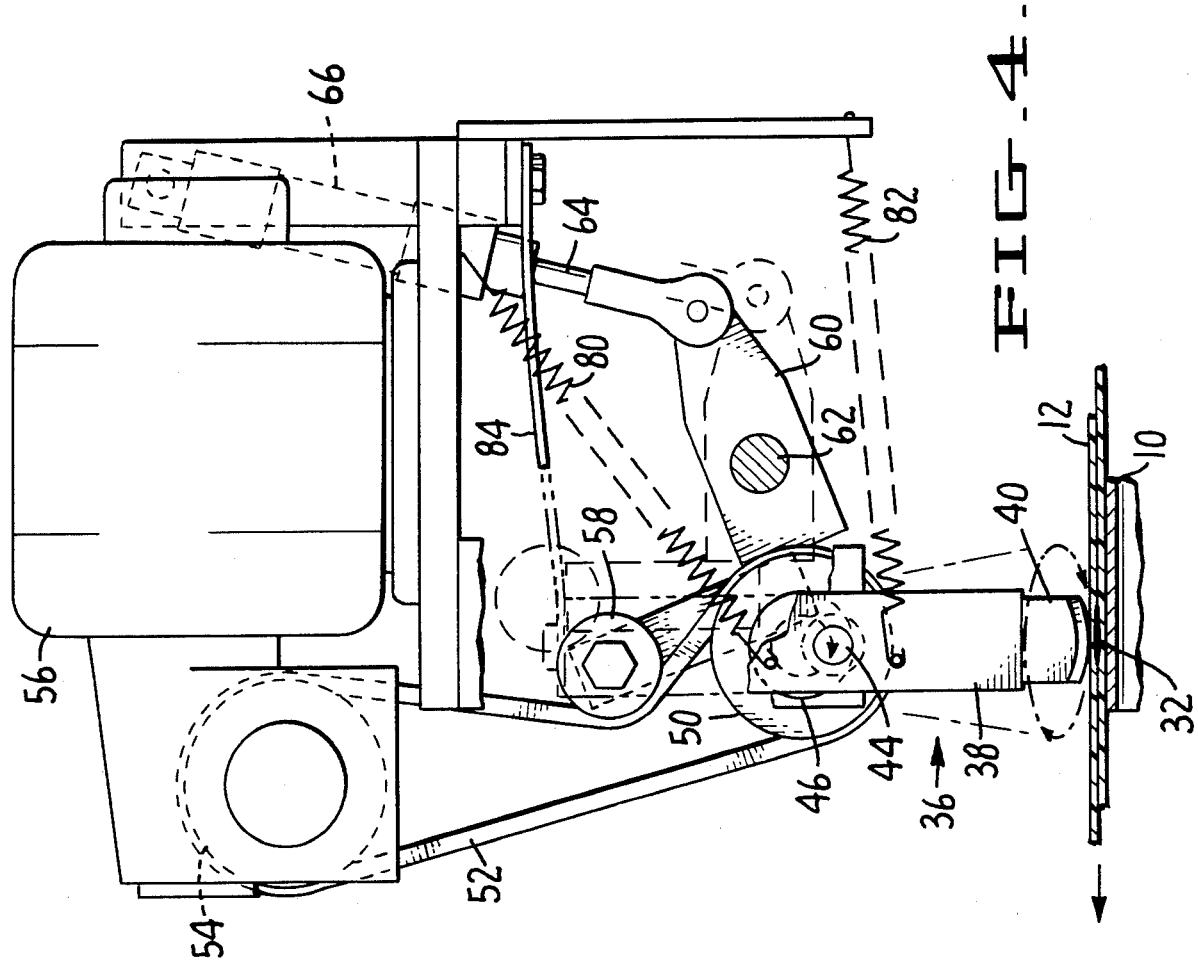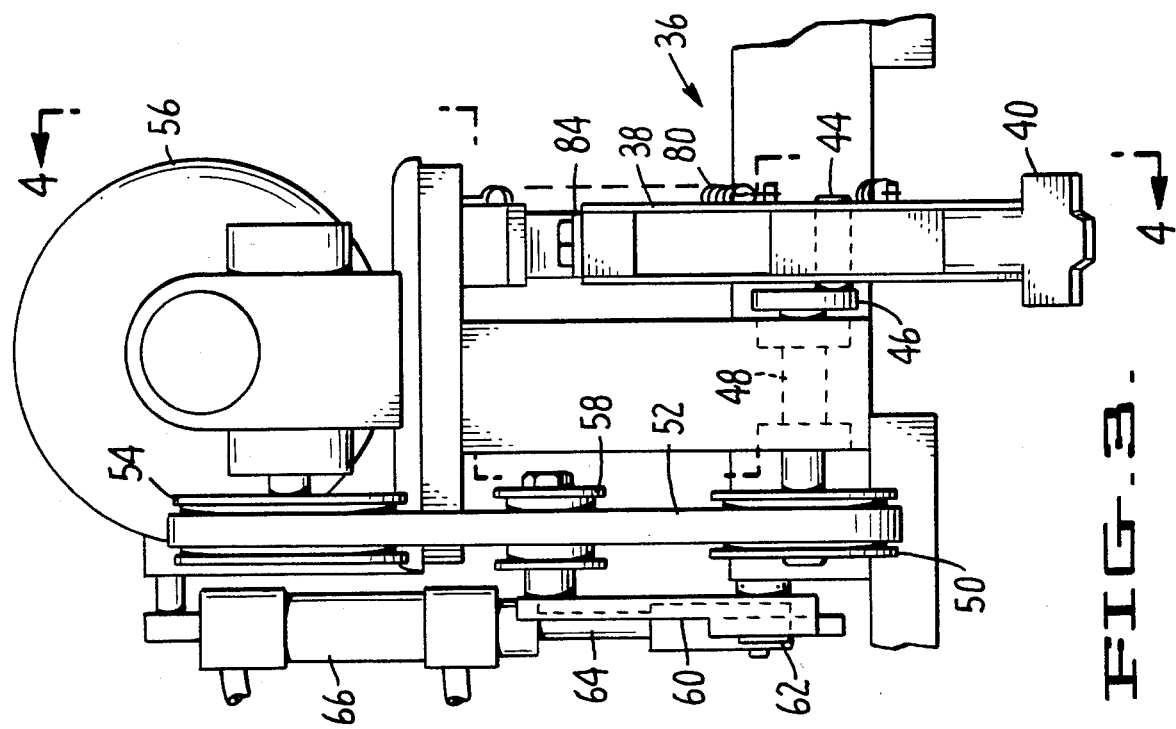

PLASTIC FILM WRAPPER AND SEALER APPARATUS

BACKGROUND OF THE INVENTION

This invention relates to apparatus for securing plastic film in position about a product, such as a roll paper product. The invention has been found to be particularly useful when employed at a station located upstream from a heat tunnel whereat the film is shrunk to conform to the configuration of the product.

Prior art arrangements exist for securing shrink wrap film in place about products prior to entry of the product into a shrink wrap tunnel. One such expedient is the hot air seam welder which forms a seam weld between overlapping portions of the plastic shrink wrap film prior to shrinking thereof. Systems of this type, however, have been found not to work well in an operational environment wherein it is desired to form intermittent welds. Heated rollers have also been employed to form discrete welds in plastic film wrapped about a package prior to the shrink wrap step but this approach too has its drawbacks. In particular, rollers having heated elements disposed about the periphery thereof require a complicated structure, utilizing such components as sliprings and brushes which wear and lose accuracy in time.

SUMMARY OF THE INVENTION

Apparatus constructed in accordance with the teachings of the present invention is simple and uncomplicated in both structure and operation, while at the same time functioning to form spaced discrete heat seals in overlapping portions of a plastic sheet secured around a product. Three criteria must be satisfied to efficiently seal overlapping portions of plastic sheet material together. These are time, pressure and temperature; that is, the element contacting the sheet material must be sufficiently hot, must exert an adequate degree of pressure on the sheet, and be in contact with the plastic material for an adequate period of time. The apparatus disclosed and claimed herein performs all of these functions in an efficient manner without employing in the construction thereof complicated structure or components prone to wear or likely to lose accuracy over an extended period of time.

The apparatus includes a curved forming plate defining an interior and having a smooth outer surface for accomodating a plastic sheet with portions of the sheet positioned in overlapping relationship, conveyor means for conveying a product through the forming plate interior whereby the plastic sheet is disposed about the periphery of the product, sealing means cooperating with the plate to form spaced discrete heat seals in the overlapping portions of the plastic sheet for maintaining the sheet about the periphery of the product, and transport means for reciprocally moving the sealer means whereby a sealer element incorporated in the sealer means remains in engagement with the overlapped sheet portions and substantially follows the path of movement thereof, and conforms to the speed thereof, for a predetermined period of time as the product is conveyed through the plate interior.

DESCRIPTION OF DRAWINGS

FIG. 3 is an enlarged frontal view showing details of selected components of the apparatus of FIG. 1; and FIG. 4 is a sectional view taken along the line 4—4 in FIG. 3.

DETAILED DESCRIPTION

Figure 2:
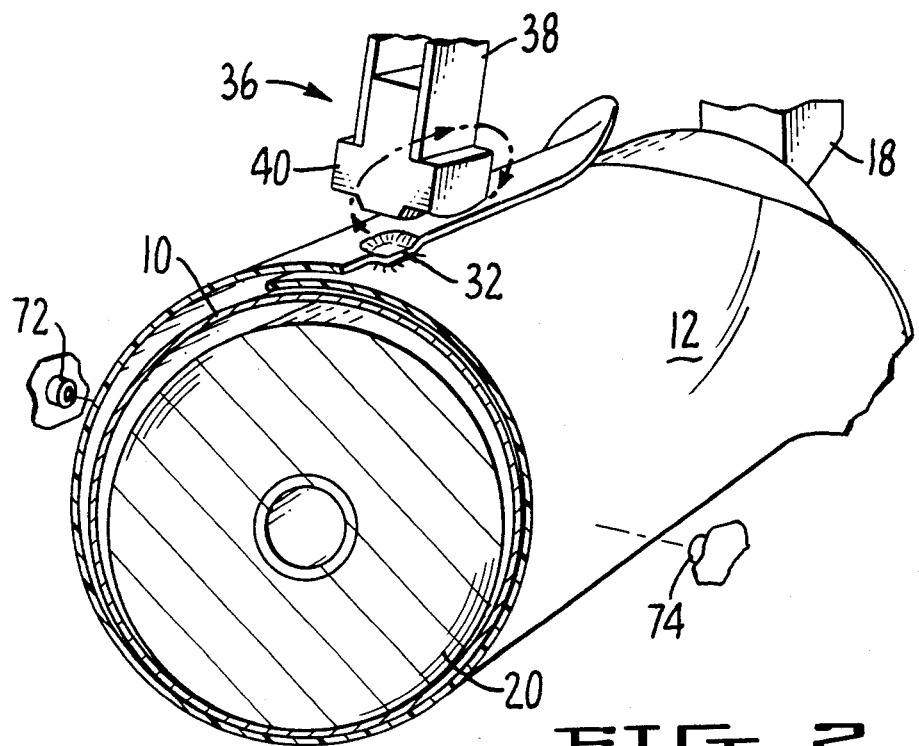
FIG. 2 is an enlarged perspective view showing details of a curved forming plate, a plastic sheet disposed about the forming plate and a diagramatic exposition of movement of a heated sealer element with respect thereto.

Referring now to the drawings, a preferred form of apparatus constructed in accordance with the teachings of the present invention is illustrated. The apparatus includes a curved forming plate 10 defining a cylindrically shaped interior and having a smooth outer surface for accommodating a plastic sheet 12 with portions of the sheet positioned in overlapping relationship, as may perhaps best be seen with reference to FIG. 2. The plastic sheet is, as is conventional, fed from a supply roll (not shown) and traverses a path defined by rolls 14, 16 and the forming plate before the ends thereof are placed in overlapping relationship on the top of the plate with suitable conventional guides (also not shown).

Figure 1:
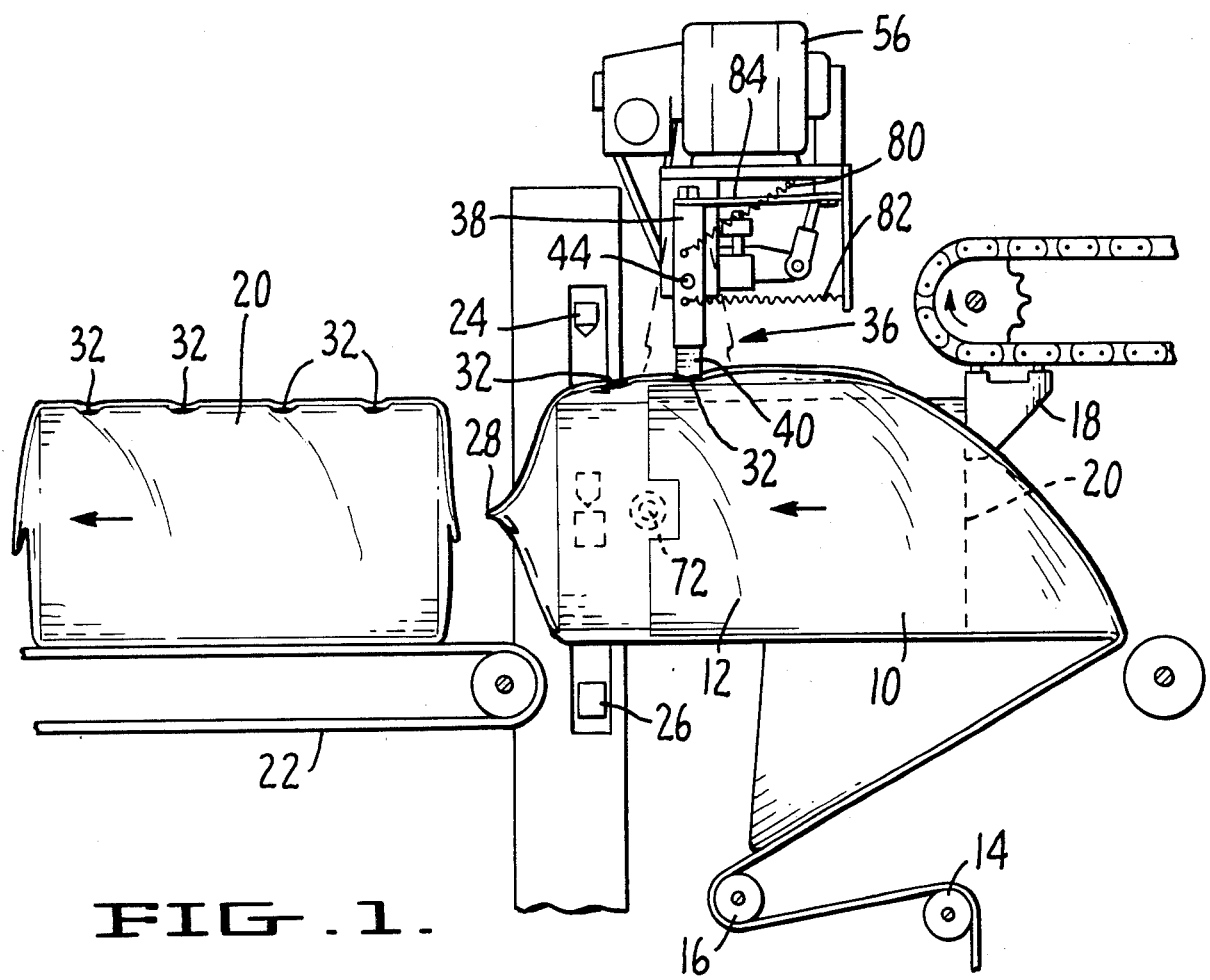
FIG. 1 is a side view of apparatus constructed in accordance with teachings of the present invention.

A conveyor 18 serves to introduce a product to be wrapped by the plastic film into the interior of the curved forming plate. In the disclosed embodiment, such product is a paper roll 20. After the roll 20 is wrapped in a manner to be described below, it is conveyed to the left (as viewed in FIG. 1) by a conveyor belt 22. In FIG. 1, one roll 20 is shown wrapped and positioned on the conveyor belt 22 and another paper roll 20 is shown passing through the interior of curved forming plate 10 and in the process of being wrapped by plastic sheet 12.

The present invention is designed to position plastic film or sheet material about the roll product prior to the introduction of the wrapped product into a heat shrink tunnel which shrinks the film in the conventional manner and completely seals it whereby the package exiting from the shrink wrap tunnel comprises the roll product and an outer wrap of film securely sealed and conforming closely to the configurations of the product. The apparatus of the present invention does not completely seal the film about the product, but rather provides spaced seals along overlapping portions of the plastic sheet whereby excess air disposed between the sheet and product may exit between the seals when shrinking of the film occurs. The heat shrink process softens the overlapping portions of the plastic sheet portions sufficiently to provide a seal along the full length of the overlapping portions.

Prior to the formation of the spaced seals along the length of the plastic sheet and roll, a seal is formed at the leading end of the plastic sheet, i.e. the left end as viewed in FIG. 1. This is accomplished by means of heat seal die elements 24 and 26 which move from the solid line position illustrated in FIG. 1 to that illustrated in the broken line position to cut the film and simultaneously form a heat seal at the leading end of the roll 20 within curved forming plate 10 and a heat seal at the trailing end of the roll 20 disposed on conveyor belt 22. Movable heat seal die elements 24 and 26 are of any suitable known type and since elements 24 and 26 do not form part of the present invention they will not be described further.

After the seal 28 has been formed at the leading end of the plastic sheet 12 and roll 20, conveyor 18 continues to advance the roll 20 and the sheet until the roll engages conveyor belt 22 and the motive force is imparted by the conveyor belt rather than the conveyor 18.

During movement of the roll 20 through the curved forming plate 10 spaced discrete seals 32 are formed in the plastic sheet portions which are positioned on top of the forming plate in overlapping relationship. These seals are formed through cooperation of the plate and sealer means 36. Sealer means 36 includes an elongated sealer arm 38 having an upper end and lower end. An electrically heated sealer element 40 is disposed at the lower end of the sealer arm and said sealer element 40 compressed the overlapping portions of the plastic sheet periodically along their length against the upper support surface of the forming plate 10, as may perhaps best be seen with reference to FIG. 2. Also with reference to that figure it may be seen that the sealer element 40 follows an eliptical path whereby the sealer element remains in engagement with the overlapped sheet portions and substantially follows the path of movement thereof for a predetermined period of time as roll product 20 is conveyed through the plate interior. While this sealer element is in engagement with the sheet portions it moves at the speed of the product. This contact over a period of time ensures the structural integrity of spaced discrete seals 32. The eliptical movement of sealer element 40 is imparted thereto by transport means which will now be described.

Arm 38 is eccentrically mounted on a pin 44 extending from a rotatable element 46 mounted on a shaft 48. Mounted on the other end of the shaft 48 is a pulley element 50. A drive belt 52 extends between pulley element 50 and a drive pulley 54 connected to the output shaft of an electric motor 56. In the disclosed embodiment of the present invention, electric motor 56 runs continuously so that drive pulley 54 rotates continuously, however, pulley element 50 and hence rotatable element 46 will not rotate unless drive belt 52 assumes a tight condition.

It will be seen that drive belt 52 loops about an idler pulley 58 which is rotatably mounted on an L-shaped bell crank lever 60 pivotally mounted on mounting shaft 62. The other end of bell crank lever 60, i.e. the right end as viewed in FIG. 4, is connected to the selectively reciprocatable piston arm 64 of an air cylinder 66. When the arm 64 is in the solid line position illustrated in FIG. 4 idler pulley 58 will cause tightening of the drive belt 52. This will result in rotation of pulley element 50 and rotatable element 46. When, on the other hand, arm 64 is extended to the dashed line position illustrated in FIG. 4, the drive belt will be loose and drive pulley 54 and its downstream elements will not be rotated.

In the disclosed embodiment of the invention the belt 52 will be tightened once during passage of a roll or other product 20 through the forming plate so that a plurality of discrete seals 32 will be formed in the plastic overwrap. In a working embodiment constructed by the co-inventors, the discrete seals 32 are spaced approximately 5 inches apart but this may of course be varied according to the wishes of one utilizing the teachings of the present invention.

Actuation of cylinder 66 may be accomplished by any desired expedient. In the present arrangement actuation thereof is accomplished by means of a suitable timer arrangement (not shown), the function of which is initiated by photoelectric devices 72 and 74 (FIG. 2), which sense the leading edge of an incoming roll. Since the precise mechanism for accomplishing this end forms no part of the present invention and is readily within the capabilities of one skilled in the art, such mechanism will not be described further. Of course, rather than using photoelectric means to initiate action of the cylinder 66, a simple movable valve mechanism may be employed to provide continuous intermittent operation of the cylinder regardless of the particular placement of the roll product with respect to forming plate 10.

Biasing means cooperates with the action of rotatable element 46 to impart the desired motion to the lower end of sealer arm 38. The biasing means includes two coil springs 80 and 82, each connected to the framework of the apparatus at one end thereof and at the other end to sealer arm 38. These coil springs 80 and 82 serve the function of moving the sealer arm away from the forming plate 10 when drive belt 52 is loose and there is no operative communication between electric motor 56 and pulley element 50. The upper end of the sealer arm 38 is attached to biasing means in the form of a flexible spring steel member 84 which serves to stabilize the position of the sealer arm 38 upper end whereby the desired eliptical motion may be imparted to the lower end thereof.

We claim:

1. Apparatus for securing plastic film in position about a product, said apparatus comprising:
   a curved forming plate defining an interior and having a smooth outer surface for accommodating a plastic sheet with portions of said sheet positioned in overlapping relationship;
   conveyor means for conveying a product through said forming plate interior whereby said plastic sheet is disposed about the periphery of said product;
   sealer means cooperating with said plate to form spaced discrete heat seals in the overlapping portions of said plastic sheet for maintaining the sheet about the periphery of said product, said sealer means including a heated sealer element; and
   transport means for reciprocatably moving said sealer means whereby said sealer element remains in engagement with said overlapped sheet portions and substantially follows the path of movement thereof for a predetermined period of time as said product is conveyed through said plate interior.

2. The apparatus of claim 1 wherein said transport means includes prime mover means and transmission means for selectively establishing operative communication between said prime mover means and said sealer means.

3. The apparatus of claim 2 wherein said transport means further includes a rotatable element, said sealer means being eccentrically mounted on said rotatable element whereby rotary motion of said rotatable element will cause movement of said sealer means sealer element.

4. The apparatus of claim 3 additionally comprising biasing means operatively connected to said sealer means, said rotatable element cooperating with said biasing means to cause said sealer element to follow an elliptical path of movement when said transmission means establishes operative communication between said prime mover means and said sealer means.

5. The apparatus of claim 3 wherein said prime mover means comprises an electrical motor having a rotating output shaft and wherein said transmission includes a drive belt extending from said output shaft to a pulley element connected to said rotatable element and clutch means for selectively tightening said drive belt to cause frictional engagement between said output shaft and said pulley element and rotation of said belt and pulley element.

6. The apparatus of claim 5 wherein said clutch means comprises an idler pulley mounted on a bell crank and means for moving said bell crank.

7. The apparatus of claim 6 wherein said means for moving said bell crank comprises a pneumatic cylinder.

8. The apparatus of claim 4 wherein said sealer means additionally includes an elongated sealer arm having an upper end and a lower end, said sealer element disposed at the lower end thereof, and said biasing means including a flexible spring steel member yieldably supporting said sealer arm at the upper end of said sealer arm.

9. The apparatus of claim 8 wherein said biasing means further includes at least one coil spring attached to said elongated sealer arm for moving said sealer arm away from said forming plate when said prime mover means and said sealer means are out of operative communication.

* * * * *